United States Patent [19]

Graser et al.

[11] Patent Number: 4,667,417

[45] Date of Patent: May 26, 1987

[54] PREPARATION OF AEROGELS

[75] Inventors: Fritz Graser, Ludwigshafen; Andreas Stange, Mannheim, both of Fed. Rep. of Germany

[73] Assignee: BASF Aktiengesellschaft, Ludwigshafen, Fed. Rep. of Germany

[21] Appl. No.: 762,284

[22] Filed: Aug. 5, 1985

[30] Foreign Application Priority Data

Aug. 11, 1984 [DE] Fed. Rep. of Germany ....... 3429671

[51] Int. Cl.$^4$ .......................... C01B 33/12; F26B 3/00
[52] U.S. Cl. ...................................... 34/9; 252/315.1; 252/315.6; 252/315.7; 423/338
[58] Field of Search ............... 252/315.1, 315.6, 315.7; 34/9; 423/338

[56] References Cited

U.S. PATENT DOCUMENTS

| | | |
|---|---|---|
| 2,093,454 | 9/1937 | Kistler .............................. 423/338 X |
| 2,249,767 | 7/1941 | Kistler .................................... 34/9 X |
| 2,443,462 | 6/1948 | Kimberlin, Jr. et al. ................. 34/9 |
| 3,672,833 | 6/1972 | Teichner et al. ..................... 423/338 |
| 4,610,863 | 9/1986 | Tewari et al. ........................ 423/338 |

*Primary Examiner*—Richard D. Lovering
*Attorney, Agent, or Firm*—Oblon, Fisher, Spivak, McClelland & Maier

[57] ABSTRACT

A process for the drying of inorganic hydrogels obtained from readily hydrolyzable compounds of the elements Al, Si, Ti, B, La, Zr, Cr, Sn, Th or Mg, and organic hydrogels based on gelatine, albumin or agar agar, from $CO_2$, to give aerogels is easy to carry out industrially, and drying can be effected at from room temperature to 90° C.

The resulting aerogels are transparent and have a low bulk density and low thermal conductivity.

The aerogels can be used as packing materials for liquid chromatography, as catalyst carriers, as substrates for enzymes and as adsorbents.

15 Claims, 1 Drawing Figure

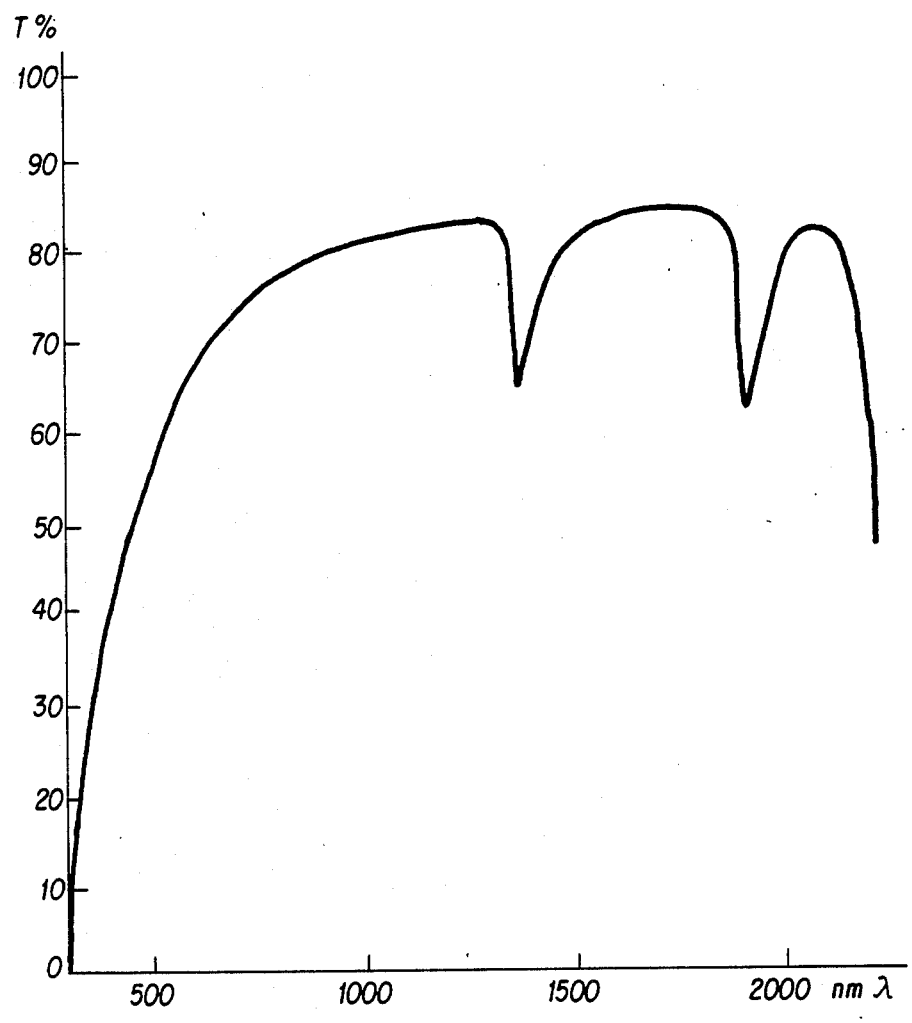

PREPARATION OF AEROGELS

It is known that hydrogels which have been obtained by hydrolysis of silanes, orthosilicates or aluminum compounds (cf. Milan Symposium, Paper 9, Galley 1 to 17; EP-A-18 955 and 67 741; U.S. Pats. Nos. 3,434,912, 2,249,767 and 2,093,454 and German Laid-Open Application DOS 2,758,415; and S. P. Mukherjee, J. Zarzycki and J. P. Traverse, Journal of Materials Science, 11 (1976), 341–355) or by acidifying silicate solutions and washing the product neutral (cf. U.S. Pat. No. 3,672,833) can be dried from the methanolic phase in the supercritical state to give aerogels. It is furthermore known that inorganic hydrogels based on magnesium, chromium, tin and thorium, and organic hydrogels based on gelatine, albumin and agar agar can be dried from propane, diethyl ether or dimethyl ether (U.S. Pat. No. 2,093,454) to give aerogels.

The drying procedure employing methanol requires temperatures of not less than 240° C. and pressures of 81 bar or higher. These conditions are disadvantageous for carrying out the process industrially. Moreover, the product cannot be discharged through valves, as is usual in reactions under pressure, but can only be removed from the reaction vessel after the pressure has been let down. To do this, the pressure apparatus has to be cooled from the high process temperature to a temperature suitable for discharging the product, i.e. to substantially below 100° C. Furthermore, filling of the pressure apparatus can be carried out only at an appropriately low temperature. However, this means that, with continuous batchwise drying, the entire pressure apparatus must repeatedly be heated to not less than 240° C. and cooled again. This is very consumptive of energy and time and makes great demands on the materials of the apparatus. Even when other organic liquids having a lower critical point are used, eg. propane or dimethyl ether, the temperatures required are above 100° C. Moreover, these liquids constitute a fire hazard, and special precautions and safety measures are therefore required for an industrial process and continuous batchwise drying.

It is an object of the present invention to provide a milder drying process for hydrogels which does not have the disadvantages of the conventional drying processes and is easy to carry out industrially.

We have found that this object is achieved, and that aerogels are obtained by drying inorganic or organic hydrogels, with retention of their structure, if the hydrogel is dried from $CO_2$. Drying by the process according to the invention is very much easier to carry out industrially since filling and emptying of the pressure apparatus, including the drying process, take place at a temperature at which it is easy to operate, and the $CO_2$ does not constitute a fire hazard.

Suitable hydrogels are inorganic hydrogels which are obtained by conventional methods, by hydrolysis of soluble organometallic compounds, oxides, hydroxides and/or readily hydrolyzable salts of the elements aluminum, silicon, titanium, boron, lanthanum, zirconium, chromium, tin, thorium, magnesium or mixtures of these, and organic gels based on gelatine, albumin or agar agar. Silica hydrogels obtainable from silanes and orthosilicates, in particular alkali metal silicates, by a conventional method are particularly preferred. The gels may have any desired shape, for example irregular pieces, cubes, sheets or rectangles, but are preferably in the form of spherical particles. If these gels are not already present in anhydrous form as lyogels in an organic medium but occur as hydrogels in an aqueous medium, the latter is replaced with a water-miscible organic medium, for example a water-miscible ketone or alcohol, e.g. acetone, ethanol, n-propanol, isopropanol or, preferably, methanol, for example in a continuous-flow apparatus. This can be carried out at from room temperature to elevated temperatures, e.g. as high as 100° C., under atmospheric or superatmospheric pressure. The exchange is carried out until the water content of the organic phase is less than 0.2%, preferably less than 0.1%. The organic phase is then replaced with liquid $CO_2$ in a continuous-flow pressure apparatus, liquid $CO_2$ preferably being used for this purpose. This procedure can be effected at room temperature (from 20° to 30° C.) and under a pressure above 70 bar, preferably from 80 to 120 bar. However, it is also possible to displace the organic phase with supercritical $CO_2$, i.e. under from 80 to 120 bar and at a temperature above the critical temperature of $CO_2$, e.g. from 35° to 80° C. When the organic phase has been completely displaced, the $CO_2$ is removed by letting down the continuous-flow apparatus, this procedure being carried out adiabatically or, preferably, isothermally. It is advantageous if the pressure is let down not all at once and abruptly, but gradually by opening the valve slightly, this taking from 10 to 120 minutes, depending on the pressure and amount. If the pressure in the pressure vessel falls too rapidly, the fine structure of the aerogel may be destroyed. Letting down the pressure is preferably effected at the supercritical temperature of $CO_2$, e.g. under from 73 to 120, preferably from 80 to 120, bar and at from 40° to 90° C. However, the temperature should not be chosen too high, so that the vessel can be emptied without prior cooling. This can be effected by pouring out, discharging or sucking out if, as stated above, the hydrogel employed preferably has a spherical shape. However, the $CO_2$ may also be removed at below its supercritical temperature, e.g. at from 20° to 25° C., by letting down the pressure. In order to prevent the product temperature and apparatus temperature from falling too low when the pressure is let down adiabatically, it is advantageous to bring the temperature to an appropriate, somewhat higher level before the pressure is let down.

The stated working conditions permit the gels to be dried in a particularly mild manner. After drying from $CO_2$, it is often advantageous to remove traces of the solvent which may still adhere to the aerogel by means of an after-treatment. This can be effected by heating at as high as 600° C. or by treatment with an inert gas stream, such as nitrogen, $CO_2$ or air, at from 30° to 100° C., preferably from 50° to 90° C. The duration of the treatment or of the heating is in general from 0.2 to 5, preferably from 0.5 to 3, hours, The novel process gives, for example, silica aerogels which are transparent (transmittance from 60 to 95%, depending on the starting material) and have a very low bulk density of about 100–200 g/l and a low density. The BET specific surface area is from 90 to 1,000 $m^2/g$ and depends on the hydrogel used (starting material). They have very low thermal conductivity (from 0.015 to 0.025 W/m.K) and are therefore very useful as insulating material. Because of the high pore volume, they are also very suitable as packing for columns for high performance liquid chromatography.

The aerogels can be used as fillers in the plastics industry, as catalyst carriers, as substrates for enzymes and as adsorbents in sorption processes, including the trapping and removal of toxic substances from animal tissues and the like.

The Examples which follow illustrate the invention. Parts and percentages are by weight, and parts by volume bear the same relation to parts by weight as that of the liter to the kilogram.

EXAMPLE 1

1,400 parts of a water-moist hydrogel) prepared as described in Example 1 of German Laid-Open Application DOS 2,103,243, the desired fraction being separated off by screening), which is in the form of spheres of about 3-6 mm, are introduced at 25° C. into a pressure vessel having a capacity of 2,500 parts by volume. The pressure vessel is closed and completely filled with methanol. Methanol (in the final stages, anhydrous methanol) is pumped through the pressure vessel at room temperature and under 5 bar until the water content of the methanol flowing out is less than 0.1%. The lyogel is then present in virtually anhydrous form in the methanol phase. 11,300 parts of methanol are required for this purpose, and this methanol can be reused after it has been dried and worked up. Replacing water with methanol takes about 7 hours. Thereafter, liquid $CO_2$ is forced through the pressure vessel at room temperature and under about 90 bar, and the methanol phase is thus replaced with liquid $CO_2$. This take about 2 hours and requires about 6,500 parts of $CO_2$.

The $CO_2$ can be collected in a suitable apparatus and can be reused after the methanol has been separated off. The pressure vessel is then heated to 60° C., the pressure being restricted to 90 bar. The $CO_2$ achieves the supercritical state and is then let down isothermally in the course of 45 minutes. Directly thereafter, the pressure vessel is emptied. 266 parts of a transparent aerogel consisting of spheres of about 3-6 mm diameter are obtained. The resulting aerogel has a density of 140 g/l, a specific surface area (determined by $N_2$ adsorption) of 382 m²/g, a transmittance of from 60 to 80% (cf. FIG. 1, transmittance curve) and a thermal conductivity of 0.02 W/m.K.

If this aerogel is then subjected to a heat treatment, for example by heating for 7 hours at 600° C., the thermal conductivity increases only slightly to 0.022 W/m.K.

If replacement of the water with methanol is carried out not under 5 bar but under 60 bar, and replacement of methanol with $CO_2$ is effected under 120 bar, the pressure also being restricted to 120 bar in the supercritical state, an aerogel having the same properties is obtained.

If the water-moist spherical hydrogels used have particles of 8-10 mm in diameter instead of about 3-6 mm, the resulting aerogel is very similar but has a correspondingly larger diameter.

EXAMPLE 2

420 parts of a water-moist hydrogel (as described in Example 1) are introduced into a vertical high pressure tube (capacity 700 parts by volume, provided with a steel frit at the lower end) at 25° C. The tube is closed and then filled completely with methanol, and the content is heated to 60°-65° C., the pressure being restricted to 50-60 bar by means of an outlet valve at the top of the tube. Anhydrous methanol is pumped through the tube through a valve at the lower end of the pressure tube at from 60° to 65° C. and under from 50 to 60 bar until the water content of the methanol flowing out is less than 0.1%. This is the case after 4,400 parts of methanol have flowed through, the time taken for this being 4.5 hours. The methanol is then replaced with $CO_2$ at from 60° to 65° C. and under 120 bar, the $CO_2$ being in the supercritical state under these conditions. This requires 1,950 parts of $CO_2$ and takes 60 minutes. Immediately thereafter, the pressure is let down isothermally in the course of 15 minutes. When the tube is emptied, 74 parts of a spherical aerogel having the same properties as the aerogel prepared in Example 1 are obtained.

If the process is operated with a plurality of batches in succession, the pressure tube, after being emptied at from 60° to 65° C., is filled again at the same temperature with the water-moist hydrogel, and the procedure is continued as described above. Changing the apparatus temperature, e..g. cooling or heating, is not necessary.

EXAMPLE 3

290 parts of a water-moist hydrogel (as described in Example 1) are introduced, as described in Example 2, into a high pressure tube having a capacity of 700 parts by volume, except that replacement of the water with methanol is carried out not at from 60° to 65° C. but at from 20° to 25° C. and 60 bar, until the methanol flowing out has a water content of less than 0.1%. This requires 4,050 parts of methanol and takes 3½ hours. The methanol is then replaced with liquid $CO_2$, this too being carried out at from 20° to 25° C. and under 80 bar. This step requires 2,400 parts of $CO_2$ and takes 45 minutes. Immediately thereafter, the pressure tube is let down isothermally in the course of 65 minutes at from 20° to 25° C. In order to maintain a temperature of 20° to 25° C. in the pressure tube while the pressure is being let down, the pressure tube is heated externally with hot water at 40° C. during this period. When the tube has been emptied, 56 parts of a spherical aerogel having the same properties as that prepared as described in Example 1 are obtained.

A virtually identical product is obtained when replacement of methanol with $CO_2$ is carried out under 120 bar instead of under 80 bar.

EXAMPLE 4

The procedure described in Example 1 is followed, except that, instead of the spherical hydrogel, a hydrogel in the form of irregular pieces of 1-3 cm³ each is used. The resulting aerogel consists of irregular pieces and has properties similar to those of the aerogel obtained as described in Example 1.

The hydrogel is prepared by hydrolysis of methyl orthosilicate as described in EP-A-18 955, column 4, lines 47 to 61.

EXAMPLE 5

Using the procedure described in U.S. Pat. No. 2,093,454, Example 8, 10 parts of agar agar are dissolved in 100 parts of boiling water, and are converted to a stiff gel by allowing the solution to cool. This gel is divided into cubes having an edge length of about 1 cm, and, after water has been replaced with methanol and the latter with $CO_2$, the cubes are dried to give an aerogel as described in Example 4. A light opaque product (resembling elder pith) is obtained

EXAMPLE 6

Using the procedure described in U.S. Pat. No. 2,093,454, Example 7, gelatine is converted to a firm gel by treatment with hot ethanol containing glacial acetic acid and cooling. To harden the gel, it is covered with a layer of butanol and left to stand for several days. The gel is divided into cube-shaped pieces having an edge length of about 1 cm, and these are introduced into a high pressure tube as described in Example 4. The alcoholic or alcohol/acetic phase is first replaced with methanol, and the latter is then replaced with $CO_2$, after which drying is carried out as described in Example 1 to give a firm, slightly opaque aerogel.

EXAMPLE 7

An $SiO_2/B_2O_3$ gel is prepared as described in EP-A-67 741, Example 7. The methanolic gel is divided into pieces (edge lengths 1–1.5 cm). The methanol is displaced from the methanol-containing gel with $CO_2$ as described in Example 1, and the lyogel is then dried as described in Example 1. An aerogel having a milky appearance is obtained.

EXAMPLE 8

An $SiO_2/TiO_2$ gel is prepared as described in EP-A-67 741, Example 8. The gel produced by aging in ethanol is divided into pieces, and treated further as described in Example 7. An aerogel having a milky appearance is obtained.

EXAMPLE 9

63 parts of a water-moist hydrogel in the form of 3–6 mm spheres (prepared from sodium waterglass as described in Example 1 of German Laid-Open Application DOS 2,103,243, the desired fraction being separated off by screening) are introduced into a pressure vessel which has a capacity of 120 parts by volume and a diameter/height ratio of 1:2 and is provided with a perforated plate above the bottom valve. The closed vessel is filled completely with methanol. Methanol (in the final stages are anhydrous methanol) is pumped through the vessel at from 20° to 25° C. and under from 0.5 to 1 bar until the water content of the methanol flowing out is less than 0.1%. This requires 640 parts of methanol and takes 5 hours. The gel is then obtained as a virtually anhydrous lyogel in the methanolic phase.

Liquid $CO_2$ is then forced through the vessel at room temperature (from 20° to 25° C.) and under 80 bar, and the methanolic phase is replaced with liquid $CO_2$. After 2.5 hours, methanol can no longer be condensed in the $CO_2$ which emerges and is let down. In order to remove the methanol very substantially from the pores of the gel, $CO_2$ is passed through the gel for a further 3.5 hours. 650 parts of $CO_2$ are required. The pressure vessel is then heated to 60° C., the pressure being restricted to 80 bar. During this procedure, the $CO_2$ achieves the supercritical state, and is let down isothermally in the course of 1.5 hours at from 60° to 65° C. 70,000 parts by volume (S.T.P.) of nitrogen are then passed through the vessel at from 80° to 85° C. and at 5 bar, after which the vessel is emptied. 10 parts of aerogel in the form of 3–6 mm spheres are obtained.

The resulting aerogel has virtually the same properties as that obtained as described in Example 1.

If the methanol is displaced with only 500 parts of liquid $CO_2$ over a total period of 4 hours, instead of with 650 parts in the course of 6 hours, a very similar aerogel is obtained.

We claim:

1. A process for the preparation of an aerogel by drying an inorganic hydrogel, which comprises replacing the water present in the water-containing hydrogel with a water-miscible organic medium, then replacing the water-miscible organic medium with liquid $CO_2$ until the gel is virtually free of the organic medium, and then removing the $CO_2$ from the $CO_2$-containing gel by releasing the pressure, thereby drying the gel.

2. The process as claimed in claim 1, wherein the organic water-miscible medium is a water-miscible ketone or alcohol.

3. The process as claimed in claim 1, wherein the organic medium is methanol, ethanol, n-propanol, isopropanol or acetone.

4. The process as claimed in claim 1, wherein the organic medium is methanol.

5. The process as claimed in claim 1, wherein replacement of the organic medium with $CO_2$ is carried out under a pressure of above 70 bar and from room temperature to 80° C.

6. The process as claimed in claim 5, wherein said pressure is from 80–120 bar.

7. The process as claimed in claim 1, wherein the hydrogel used is a silica hydrogel.

8. The process as claimed in claim 7, wherein the $CO_2$-containing gel is let down, and hence dried, under supercritical conditions.

9. The process as claimed in claim 7, wherein the organic water-miscible medium is a water-miscible ketone or alcohol.

10. The process as claimed in claim 9, wherein the organic medium is methanol, ethanol, n-propanol, isopropanol or acetone.

11. The process as claimed in claim 9, wherein the organic medium is methanol.

12. The process as claimed in claim 11, wherein the $CO_2$-containing gel is let down, and hence dried, under supercritical conditions.

13. The process as claimed in claim 11, wherein replacement of the organic medium with $CO_2$ is carried out under a pressure of above 70 bar and from room temperature to 80° C.

14. The process as claimed in claim 13, wherein said pressure is from 80–120 bar.

15. A drying process for the preparation of a transparent aerogel by drying an inorganic water-containing hydrogel, comprising:
   (a) replacing the water present in the water-containing hydrogel with a water-miscible alcohol,
   (b) replacing the alcohol with liquid $CO_2$ until the gel is substantially free of the water-miscible alcohol; and
   (c) removing the $CO_2$ from the $CO_2$-containing gel by releasing the pressure, thereby drying the gel.

* * * * *